June 21, 1966

G. J. BROUSSARD ET AL 3,256,602

ORTHODONTIC APPLIANCE

Filed March 1, 1963

INVENTOR.
GARFFORD J. BROUSSARD
CLIFFORD J. BROUSSARD
BY

ATTORNEY

June 21, 1966     G. J. BROUSSARD ET AL     3,256,602
ORTHODONTIC APPLIANCE
Filed March 1, 1963     2 Sheets-Sheet 2
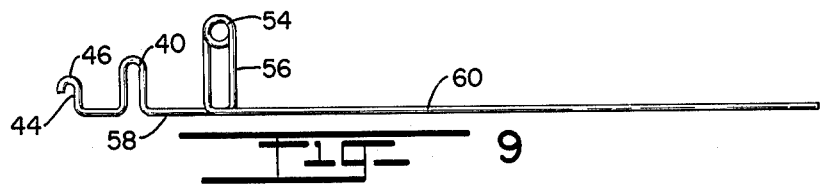
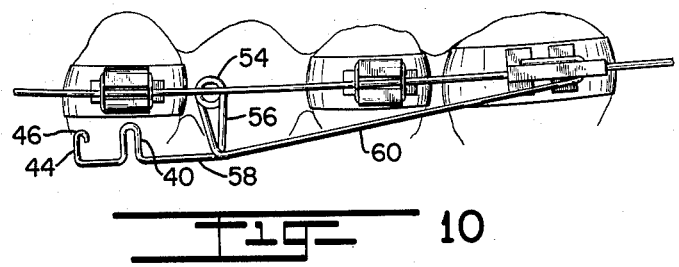
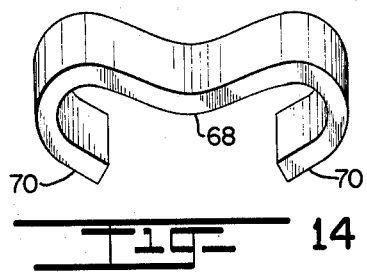
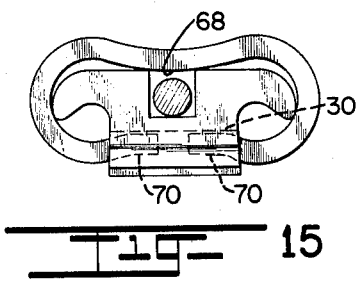
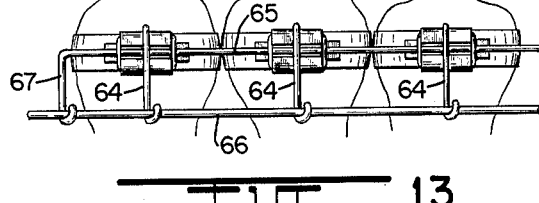
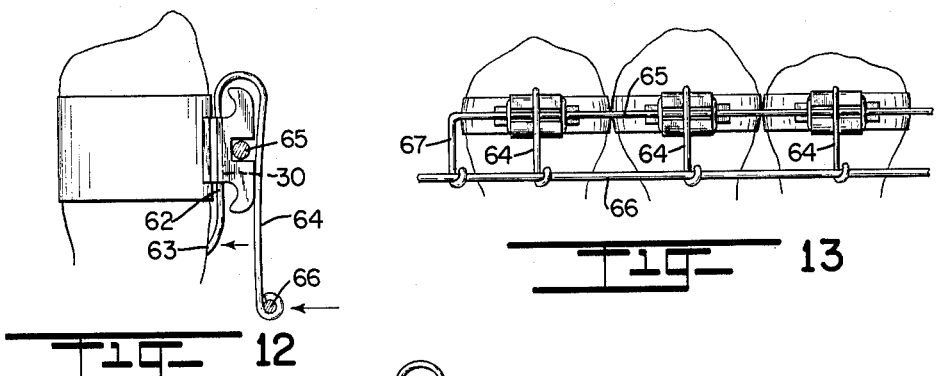
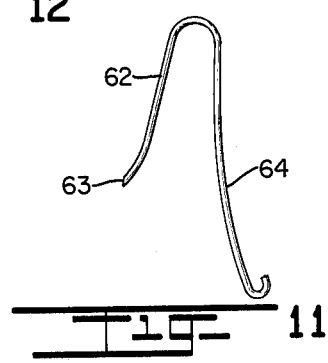
INVENTOR.
GARFFORD J. BROUSSARD
CLIFFORD J. BROUSSARD
ATTORNEY

United States Patent Office 3,256,602
Patented June 21, 1966

3,256,602
ORTHODONTIC APPLIANCE
Garfford J. Broussard and Clifford James Broussard,
both of 8801 Gaylord, Houston, Tex.
Filed Mar. 1, 1963, Ser. No. 262,132
5 Claims. (Cl. 32—14)

This invention relates to orthodontic appliances and, more particularly, it relates to an orthodontic bracket and auxiliary appliances used in combination therewith for applying corrective forces to misaligned teeth.

The bracket and associated appliances which comprise this invention are used in the orthodontic art of correcting the position of misaligned teeth of the dental arch, and are used in conjunction with a flexible arch bar which is supported across a dental arch by anchorages at either end to suitable anchoring teeth such as molars. The invention is particularly directed to the bracket means by which said arch wire is connected intermediate of its ends to selected teeth, and the wires, springs or tensioning means for securing the bracket to the arch wire and for applying corrective forces to misaligned teeth to continuously exert a properly oriented force on the teeth to properly position them with respect to other teeth in the dental arch.

Various types of brackets for attachment to tooth bands for securing the arch wire to selected teeth have been used in the past and most of them require ligature wires or other means peculiar to the bracket construction for securing the arch wire to the bracket. Quite often the ligature wires serve only the single function of securing the arch wire to the bracket, and the method of anchoring them to the bracket and securing them to the arch wire is time-consuming and requires considerable manipulative operation. Some of the prior art brackets and ligature wires are bulky and interfere with the internal surfaces of the cheeks or other parts of the mouth. Certain prior art type brackets were not adapted for secure attachment of the arch wire in its receiving slot.

As is well known, various wires, springs or tensioning appliances are used in conjunction with tooth brackets and arch wires for applying corrective forces to misaligned teeth. Disadvantages of prior art tensioning appliances are the fact that these appliances and the brackets onto which they were anchored did not permit anchoring in a manner to prevent twisting, rocking and other movement interfering with precise directional control of applied correctional forces.

Accordingly, it is an object of this invention to provide a tooth bracket for application to a tooth band providing the dual function of securing an arch wire to a tooth and also anchoring an orthodontic wire or tensioning member in a secure manner such that corrective forces are applied to move a tooth.

It is another object of this invention to provide a combination bracket and arch wire securing member which provides a secure anchorage for the arch wire and extreme ease of application of the member securing it to the bracket.

It is still another object of this invention to provide a combination of bracket and tensioning members for applying corrective forces to misaligned teeth which permits secure anchoring of the tensioning members and extreme facility in anchoring the tensioning members to the bracket.

It is an additional object of this invention to provide a combination of anchoring bracket and tensioning members for applying corrective forces to misaligned teeth in which the manner of anchoring the tensioning members and the construction of the tensioning members and bracket is such that precise directional control of corrective forces or components of corrective forces can be achieved.

It is another object of the invention to provide a bracket having an anchoring slot therein which prevents tilting or rotation of the member anchored in the slot.

It is a further object of this invention to provide a combination of orthodontic bracket, arch wire securing means and orthodontic corrective tensioning means which is small, compact and can be economically manufactured.

The above objects are accomplished as respects the bracket by a bracket member comprising a body member having upper and lower portions provided, respectively, with a horizontal arch receiving channel and a transverse, open, downwardly facing anchoring slot of rectangular cross section. As respects auxiliary appliances or tensioning members, the invention includes as part of the combination a T-spring for anchoring an arch wire in the arch wire receiving slot as well as for applying corrective forces to misaligned teeth, and orthodontic wires serving as corrective force-applying members. The arch wire anchoring member or T-spring and the force-applying members are integrally constructed, preferably of wire, and provided with a U-bend forming a double post which is inserted in the slot in the bottom of the bracket for anchoring. The orthodontic wires or tensioning members for the application of the various types of corrective forces, such as, retracting, torquing, uprighting, and other forces depending upon the type of tooth misalignment, are constructed to provide these forces as set forth hereinbelow.

The invention is best described by reference to the accompanying drawings wherein like numerals represent like parts, and in which:

FIGURE 9 is a top plan view of a tensioning member of the invention used to anchor an arch wire and apply retractive forces to a tooth;

FIGURE 10 is a side elevational view showing the bracket of FIGURE 9 applied to teeth in the dental arch to anchor an arch wire and apply corrective retractive forces to teeth in the arch;

FIGURE 11 is a side elevational view of a torquing spring used in combination with the bracket of FIGURE 1;

FIGURE 12 is a side elevational view of the torquing spring of FIGURE 11 inserted in the bracket of FIGURE 1 mounted on a tooth band and showing the direction of applied forces achieved with it;

FIGURE 13 is a front elevational view showing a series of the brackets of FIGURE 9 applied to adjacent teeth to provide a torquing force and connected together at their ends by a torquing bar;

FIGURE 14 is a perspective view of an E-clamp used in conjunction with the bracket of the invention for anchoring an arch wire; and FIGURE 15 is an end view showing the clamp of FIGURE 14 applied to the bracket of FIGURE 1 to anchor an arch wire in the arch wire receiving channel.

Figure 1:
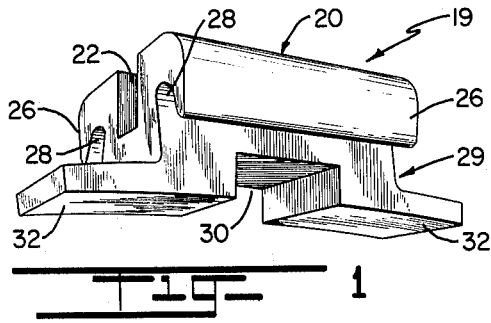
FIGURE 1 is a perspective view of the bracket of this invention.

Referring now to FIGURE 1, the bracket comprises a body 19 comprised of an upper portion indicated generally at 20.

The upper portion 20 of the bracket is provided with an arch wire receiving and anchoring channel 22 which extends horizontally throughout the entire length of the upper section. This channel is open in the form of the bracket used to anchor the arch wire to teeth intermediate the ends of the arch wire, and takes the form of a closed channel in the modification of the bracket used as a buccal tube for anchoring the ends of the arch wire to anchor teeth. It is preferably of rectangular cross section but may be of other cross-sectional design. The bracket itself is preferably made of stainless steel or other type durable metal. It may be made of plastic or other rigid suitable non-metallic material.

The bracket in the preferred modification is constructed with wings 26 bordering slot 22 which run horizontally of the upper section and extend laterally beyond the lower section. The bracket may be constructed without the wings. The horizontal edges of the wings are curved downwardly to provide slots 28 in the bottoms which may be used to anchor ligature wires or for similar purposes. Alternate equivalent means may be provided on the wings 26 for anchoring ligature wires.

The bottom portion or base 29 of the bracket is provided with a transversely extending, downwardly facing open slot 30 of rectangular cross section which is for the purpose of anchoring a T-spring for securing the arch wire in place, or for anchoring wires, springs and other tensioning members for applying corrective forces to teeth. As will be noted, in the preferred construction of the bracket, the ends of the upper portion terminate short of the bottom portion or base resulting in the formation of feet 32, the bottom surfaces of which are secured to a tooth band in anchoring the bracket. The bracket is constructed for mounting on a tooth band with the transverse slot 30 substantially parallel to the vertical axis of the tooth. Hereinafter the axis of the bracket parallel to the vertical axis of the tooth will be referred to as the "vertical axis" and the axis normal to the vertical axis of the bracket as the "horizontal axis" of the bracket.

Figure 2:
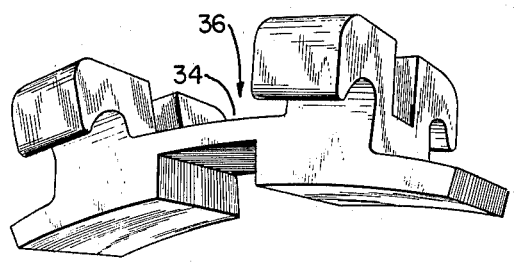
FIGURE 2 is a perspective view of a "Siamese" type bracket being a modification of that shown in FIGURE 1.

FIGURE 2 shows a modification of the bracket of FIGURE 1 referred to as a "Siamese" bracket and which has a longer longitudinal dimension to permit curving to conform to the surface of the curved tooth band. This bracket is constructed with a portion of the upper section cut out at 34 to provide for a thin bridge section 36 which permits bending of the bracket. The construction results in a pair of wings at each end of the bracket.

Figure 3:
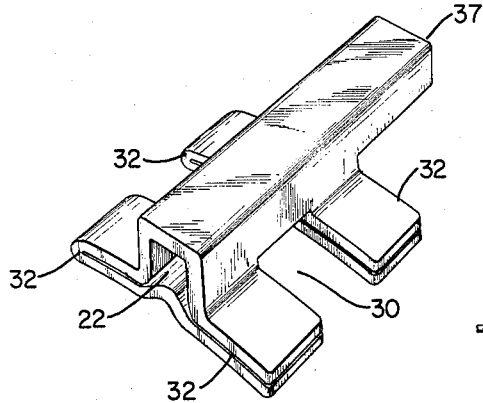
FIGURE 3 is a perspective view of a buccal type bracket incorporating the inventive features of the bracket of FIGURE 1.

Referring to FIGURE 3, a buccal-type modification of the bracket, the arch wire receiving channel 22 is a covered channel for receiving and anchoring the end of an arch wire. This bracket is constructed with anchoring slot 30 which serves the same purpose as the anchoring slot bearing the same numeral of the bracket shown in FIGURE 1. This bracket is constructed by suitably cutting out a single metal blank and forming it to provide the double layer feet 32 for attachment of the bracket to a tooth band. The juncture of the projection 37 and front feet 32 may be used for anchoring springs, wires and other tensioning devices. This bracket is constructed for attachment to an anchor tooth, such as a molar, with its vertical axis parallel to the vertical axis of the tooth. One of these brackets is attached to a molar at either end of the dental arch and the arch wire is secured by its ends in the channel 22.

Figure 4:
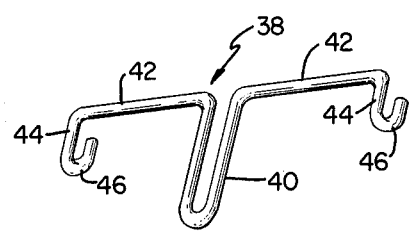
FIGURE 4 is a plan view of a T-spring or arch wire anchoring member of the invention.
Figure 5:
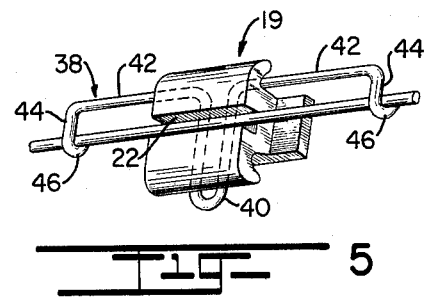
FIGURE 5 is a plan view of the combination bracket and arch wire anchoring T-spring of the invention assembled to secure an arch wire in position.

Referring to FIGURES 4 and 5, the T-spring 38 or tensioning member used to secure the arch wire in place and to exert corrective pressure on misaligned teeth is integrally constructed of a continuous wire which is bent back upon itself to form a U-bend or double post 40 with T-arms 42 extending perpendicularly from the open end of the U-bend which are bent near their ends to form locking arms 44 which terminate in hooks or locking means 46. The post may also be of one-piece or solid construction. The T-spring, as well as the other spring members described hereinafter, are referred to herein as "tensioning members" as all of them are used to apply corrective pressure by means of wire or spring means to correct the position of misaligned teeth.

As shown in FIGURE 5, to secure an arch wire in the arch wire receiving channel 22 of the bracket, the U-bend or double post 40 is fitted into the slot 30 in proper size and the hooks 46 are slipped over the arch wire to hold it securely in the channel. In this arrangement the U-bend or double post 40 fits in the slot 30 between the top of the slot and the top of the tooth band and with the outermost portion of the legs of the U-bend fitting against the sides of the rectangular slot so that there is no tilting, rotating or other relative movement between the double post 40 and the bracket. The outside dimensions of the U-bend or double post are slightly less than the internal dimensions of the rectangular slot. The ease with which the T-spring can be applied is evident from the above-explained construction and operation of the combined bracket and T-spring. As set forth above, the T-spring can be used in combination with the rectangular slot to rotate teeth. If a malaligned tooth is rotated out of line, application of the bracket and T-spring will automatically apply corrective rotative force to the tooth.

It is seen from the above description that the T-arm replaces the ordinary conventional ligature wire with its attendant disadvantages as to difficulty in application and failure to secure the arch wire in the slot in the required secure manner. An additional advantage of the T-spring is the fact that it serves the dual purpose of securing the arch wire in the channel, and exerting a corrective force on teeth to rotate them through the medium of the double post U-bend which will not rotate under applied pressure because of the broad base formed by the two posts.

Figure 6:
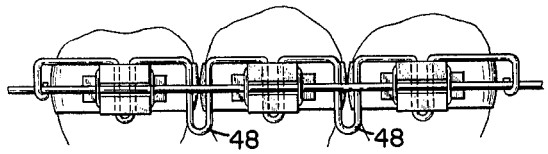
FIGURE 6 is a front elevational view showing the T-spring of FIGURE 4 made in continuous form and applied to a number of teeth in a dental arch to provide corrective forces thereto.

The showing in FIGURE 6 is of a modified T-spring made of a continuous spring in which a series of U-bends are connected to a number of teeth in the dental arch and tensioning loops 48 are formed between the U-bends for applying corrective forces to the teeth, in this instance forces for expanding and contracting spaces between teeth. T-arms with associated locking means are provided at each end of the multiple U-bend T-spring for anchoring to the arch wire. Other forms of tensioning loops may be used in this assembly to provide other corrective forces, such as, intruding and extruding forces and others.

Figure 7:
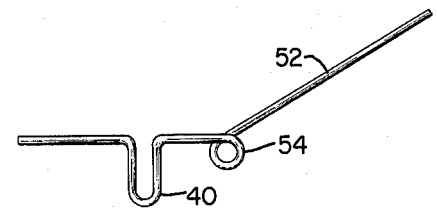
FIGURE 7 is a plan view of the uprighting spring of the invention which is used in combination with the bracket of FIGURE 1.
Figure 8:
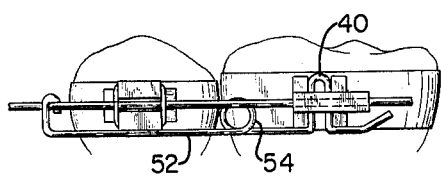
FIGURE 8 is a side elevational view of the combination bracket and uprighting spring of the invention showing the spring applied to teeth in the dental arch to anchor an arch wire in position and to exert corrective forces on a tooth.

Referring to FIGURE 7, the uprighting spring or tensioning member shown therein is attached to the bracket by means of U-bend 40 as in the case of the T-spring. The uprighting arm 52, through which corrective forces are applied to a tooth is provided with a helical loop 54 to provide for gentle and resilient tensioning of the arm. The uprighting spring assembly is anchored to an anchor tooth by the buccal tube or by other conventional means. Multiple helical loops may be used for additional resiliency. The uprighting arm is used for uprighting teeth or for rotating teeth which are out of radial alignment. The helical loop or loops provide a more gradual or even pressure and diminish the rigidity of pressure resulting from use of a straight piece of wire. FIGURE 8 shows an application of the uprighting spring used in conjunction with the bracket to exert an uprighting force on a tooth. This figure also shows the anchoring of the spring to a buccal tube by the double post.

The above described application of the uprighting spring is another illustration of the combination of a tensioning member with the bracket of the invention for applying corrective force to teeth, the effectiveness of the uprighting force being achieved largely by the cooperation of the vertical double post with the bracket to provide a secure anchoring means which will not permit tilting or other relative movement between the tensioning member and the bracket.

Reference is now made to FIGURE 9 for an illustrative embodiment of another type tensioning member referred to as a cuspid retractor which is effectively used with the bracket of the invention. The cuspid retractor is anchored to the bracket by means of the vertical double post 40 and the arch wire is locked in its slot by means of a locking arm 44 and lock 46 in a manner similar to that by which the T-spring 38 is locked. This tensioning member is provided with a vertical loop 54. The vertical loop 54 is constructed to provide additional control over the applied force in that the legs 56 of the loop are crossed with respect to their orientation with the loop so that the distal arm 58 and the molar arm 60 are biased together to prevent them from separating with consequent undesirable forces on the tooth. This construction provides for precise directional control of applied forces. FIGURE 10 shows an application of the cuspid retractor used in combination with the bracket of the invention in which the retractor is securely anchored by means of the vertical post and slot arrangement to provide precisely-controlled required corrective force to a tooth. The end of the molar arm may be anchored to the buccal tube as shown in FIGURE 8. The retractor operates to facilitate the movement of the cuspid and to control the mesial-distal rotation of a tooth, as well as to prevent extensive overtipping due to movement of a tooth along the arch wire. The bracket achieves trollying of the tooth along the arch wire, i.e., it maintains proper tooth relationship occlusally, gingivally and lingually as the tooth is moved.

FIGURES 11, 12 and 13 show another type tensioning member referred to as a torquing spring which is used in combination with the bracket of the invention to provide inward or torquing force against the tooth section of teeth. As shown in FIGURES 11 and 12, the spring is so constructed that when the post 62 is inserted in the slot 30 of the bracket, pressure will be exerted by element 63 of the spring against the tooth in a direction as shown by the top arrow in FIGURE 12. The other end 64 of the torquing spring is anchored to a torquing bar 66. This spring is ordinarily used with the bracket as shown in FIGURE 13 in which a torquing bar 66 is attached to the ends of the torquing springs to provide uniform pressure on one or more teeth. In this application the arch wire 65 is constructed with an inset partially shown at 67 to which the torquing bar is anchored and the arch wire continues on to the bracket on adjacent teeth.

FIGURES 14 and 15 show another form of tensioning member referred to as an E-clamp which is used to secure the arch wire in its channel. It consists of a continuous strip of metal bent to form an inward boss 68 and downwardly and angularly extending locking ends 70 which fit into the slot 30 of the bracket. In application, the boss is inserted over the arch wire and pressure exerted on the bends to clamp the ends into position in the slot so that the clamp is spring-biased into secure position on the bracket with the boss 68 over the arch wire receiving channel to firmly hold the arch wire in position.

It is an advantage of the bracket of the invention that it aids in accomplishing a dual function, i.e., anchoring the arch wire and aligning teeth. The T-spring and the other tensioning members used with the bracket may be applied with the double post inserted from the gingival or occlusal side and may be made in the form of continuous appliances with the vertical posts attached to adjacent or alternate teeth in the dental arch. An additional desired feature of the tensioning members is that the post may be constructed at various angles on the tensioning member and this feature used to apply additional corrective force to misaligned teeth. It is seen from the above description that a bracket has been provided which as used in combination with various tensioning appliances serves to achieve various functions, such as, the secure anchoring of an arch wire and rotation of teeth, as well as the application of torquing, retracting, uprighting and other forces to misaligned teeth with precise directional control of the forces to provide for movement of teeth in the quickest and most effective manner.

A further advantage of the invention is the ease of application of the various tensioning members, such as, T-springs, uprighting springs, cuspid retractors and others with a minimum of instruments and in a confined space. The bracket provides for securely anchoring a tensioning member therein against movement from forces applied from any direction. Additionally, the bracket and associated appliances are readily adaptable to economical manufacturing processes for their construction.

While the principal inventive feature of the bracket, an anchoring slot of rectangular cross section cooperating with an anchoring post of the same cross section, has been illustrated with a bracket of a special configuration, it is not limited to such configuration but may be used with any configuration of bracket to which it is adaptable.

It is therefore to be understood that various modifications and changes may be made in the construction and arrangement of parts of the present invention without departing from the spirit and scope thereof as defined by the appended claims.

What is claimed is:

1. Orthodontic apparatus comprising in combination: a bracket having a horizontal axis and a vertical axis attached to a tooth band and comprising a base portion having an open, rectangular slot therein substantially transverse to said horizontal axis and a top portion having a horizontal arch wire receiving channel therein substantially normal to said slot, the bottom of said channel, taken with reference to said top portion, being located above the upper surface of said slot; a tensioning member comprising an integrally formed rod like member having therein a post secured in said slot and T-arms extending from either side of said post substantially perpendicular to said post and terminating in tensioning arms on the same side of said T-arms as said post extending substantially perpendicular to said T-arms and having locking means at their ends for locking an arch wire in said channel.

2. An edgewise orthodontic bracket comprising: a substantially rectangular base section having lateral edges and endwise edges and an open, rectangular, transverse post receiving slot passing completely through said bracket substantially normal to said lateral edges and having a horizontal width substantially twice its depth; a top section on said base section having ends substantially parallel to said endwise edges located internally thereof and having an open arch wire receiving channel passing completely through said bracket substantially normal to said post receiving slot with its horizontal center located on the horizontal center of said top section, the transverse center of said post receiving slot being located on the transverse center of said top section, and the top surface of said slot being located on a horizontal plane below that on which the bottom surface of said channel is located; and wing members extending from either side of said channel terminating in downwardly curved portions forming horizontal channels between their inside surfaces and the outside lateral surfaces of said top section.

3. Orthodontic apparatus comprising, in combination: a bracket having a vertical axis and a horizontal axis attached to a tooth band and comprising a base section having an open, rectangular slot therein substantially transverse to said horizontal axis and a top section having a horizontal arch wire receiving channel therein normal to said slot; an arch wire in said channel an integrally formed tensioning member having a U-bend forming a post inserted in said slot and T-arms extending from either side of the open end of said post substantially normal to said post having locking arms substantially parallel to said post terminating in hooks clamping around the arch wire in said channel and securing it.

4. Orthodontic apparatus comprising, in combination: a plurality of brackets each attached to a tooth band for mounting on a separate tooth and an integrally formed tensioning member interconnecting at least adjacent brackets, each bracket comprising a base section having therein a vertical open slot and a top section having a horizontal arch wire receiving channel therein, said tensioning member provided with tensioning arms at each of its ends terminating in locking means and having a plurality of interconnected U-bends forming posts, adjacent posts secured in slots of correspondingly adjacent brackets and an arch wire in said channels secured therein by at least one of said locking means.

5. The apparatus of claim 4 in which tensioning loops are provided in said member between said posts and in at least one of said tensioning arms for applying corrective forces to teeth.

References Cited by the Examiner

UNITED STATES PATENTS

| | | | |
|---|---|---|---|
| 1,014,029 | 1/1912 | Angle | 32—14 |
| 1,821,171 | 9/1931 | Atkinson | 32—14 |
| 1,890,487 | 12/1932 | Angle | 32—14 |
| 2,230,315 | 2/1941 | Winslow | 32—14 |
| 2,524,763 | 10/1950 | Brusse | 32—14 |
| 3,085,335 | 4/1963 | Kesling | 32—14 |
| 3,093,903 | 6/1963 | Kesling | 32—14 |

FOREIGN PATENTS 189,504    5/1937    Switzerland.

OTHER REFERENCES

Begg/Chun-Hoon bracket "C" advertised on page 12 of the Unitek catalog, copyright 1962.

RICHARD A. GAUDET, *Primary Examiner.*

J. W. HINEY, JR., *Assistant Examiner.*